(12) United States Patent
Gong

(10) Patent No.: US 12,335,829 B2
(45) Date of Patent: Jun. 17, 2025

(54) DATA TRANSMISSION METHOD AND APPARATUS, STORAGE MEDIUM, AND TERMINAL DEVICE

(71) Applicant: GUANGDONG OPPO MOBILE TELECOMMUNICATIONS CORP., LTD., Guangdong (CN)

(72) Inventor: Jinhua Gong, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 240 days.

(21) Appl. No.: 17/808,654

(22) Filed: Jun. 24, 2022

(65) Prior Publication Data
US 2022/0330000 A1   Oct. 13, 2022

Related U.S. Application Data

(63) Continuation of application No. PCT/CN2020/139537, filed on Dec. 25, 2020.

(30) Foreign Application Priority Data

Dec. 25, 2019  (CN) .......................... 201911361284.6

(51) Int. Cl.
*H04W 4/80*   (2018.01)
*H04W 68/00*   (2009.01)
(Continued)

(52) U.S. Cl.
CPC ........... *H04W 4/80* (2018.02); *H04W 68/005* (2013.01); *H04W 68/02* (2013.01); *H04W 72/543* (2023.01)

(58) Field of Classification Search
CPC ..... H04W 4/80; H04W 68/005; H04W 68/02; H04W 72/543; H04W 16/14;
(Continued)

(56) References Cited

U.S. PATENT DOCUMENTS 8,737,917 B2   5/2014  Desai et al.
2007/0047506 A1   3/2007  Froehling et al.
(Continued)

FOREIGN PATENT DOCUMENTS

CN   100352238   11/2007
CN   106535104   3/2017
(Continued)

OTHER PUBLICATIONS

CNIPA, Second Office Action for CN Application No. 201911361284.6, Jul. 12, 2022.
(Continued)

*Primary Examiner* — John D Blanton
(74) *Attorney, Agent, or Firm* — Hodgson Russ LLP

(57) ABSTRACT

A data transmission method and apparatus, a non-transitory computer storage medium, and a terminal device are provided in implementations of the present disclosure. The method includes the following. A scan parameter of a Bluetooth scan or/and a data packet of data transmission is adjusted under a condition. Data is transmitted to a target Bluetooth device via Bluetooth according to an adjusted scan parameter or/and an adjusted data packet.

20 Claims, 9 Drawing Sheets

(51) Int. Cl.
*H04W 68/02* (2009.01)
*H04W 72/543* (2023.01)

(58) Field of Classification Search
CPC ..... H04W 84/18; H04W 76/14; H04W 28/06; H04W 28/22; Y02D 30/70; G10L 19/00; G10L 19/24; H04L 1/0007; H04L 1/0009
See application file for complete search history.

(56) References Cited

U.S. PATENT DOCUMENTS

| | | | | |
|---|---|---|---|---|
| 2009/0252128 | A1* | 10/2009 | Yang | H04B 1/715 370/338 |
| 2011/0021142 | A1 | 1/2011 | Desai et al. | |
| 2011/0274021 | A1* | 11/2011 | He | H04W 52/0238 370/311 |
| 2012/0169854 | A1* | 7/2012 | Seo | G09G 5/003 348/56 |
| 2012/0238205 | A1 | 9/2012 | Reunamaki et al. | |
| 2012/0256726 | A1* | 10/2012 | Honkanen | G01S 3/48 340/10.1 |
| 2014/0206286 | A1* | 7/2014 | Palin | H04W 8/005 455/41.2 |
| 2015/0133054 | A1* | 5/2015 | Chen | H04W 4/80 455/41.2 |
| 2017/0026777 | A1* | 1/2017 | Denboer | H04W 72/0446 |
| 2017/0318557 | A1* | 11/2017 | Chapelot | H04W 36/0005 |
| 2018/0091962 | A1* | 3/2018 | Hernandez | G01S 19/17 |
| 2018/0220472 | A1* | 8/2018 | Schopp | H04L 63/0428 |
| 2020/0100089 | A1* | 3/2020 | Ferrari | H04W 8/005 |
| 2022/0038216 | A1* | 2/2022 | Cheong | H04L 5/0055 |
| 2022/0330000 | A1* | 10/2022 | Gong | H04W 68/02 |

FOREIGN PATENT DOCUMENTS

| | | |
|---|---|---|
| CN | 109041024 | 12/2018 |
| CN | 109963345 | 7/2019 |
| CN | 110072011 | 7/2019 |
| CN | 110324810 | 10/2019 |
| CN | 110460985 | 11/2019 |
| CN | 110601971 | 12/2019 |

OTHER PUBLICATIONS

WIPO, International Search Report and Written Opinion for International Application No. PCT/CN2020/139537, Mar. 29, 2021.
CNIPA, First Office Action for CN Application No. 201911361284.6, Jan. 19, 2022.
EPO, Office Action issued for European Application No. 20907629.8, Nov. 20, 2023.
Jichin Lee et al., "P2P Content Distribution to Mobile Bluetooth Users," IEEE Transactions on Vehicular Technology, Jan. 1, 2010, p. 356-367, vol. 59, No. 1.
EPO, Extended European Search Report for EP Application No. 20907629.8, Nov. 21, 2022.
CNIPA, Office Action for CN Application No. 201911361284.6, Oct. 28, 2022.
Epo, Communication for EP Application No. 20907629.8, Sep. 10, 2024.

* cited by examiner

100

DATA TRANSMISSION METHOD AND APPARATUS, STORAGE MEDIUM, AND TERMINAL DEVICE

CROSS-REFERENCE TO RELATED APPLICATIONS

This application is a continuation of International Application No. PCT/CN2020/139537, filed Dec. 25, 2020, which claims priority to Chinese Patent Application No. 201911361284.6 filed on Dec. 25, 2019, the entire disclosures of which are incorporated herein by reference.

TECHNICAL FIELD

This disclosure relates to the field of computer technology, and in particular to a data transmission method and apparatus, a storage medium, and a terminal device.

BACKGROUND

At present, terminal devices such as mobile phones are able to be connected with multiple Bluetooth devices simultaneously, which requires the mobile phone to keep an inquiry scan and a page scan enabled, so that other Bluetooth devices can discover and connect with the terminal device. In order to make discovery and connection faster, scan types with wider scan windows are usually selected for scanning.

When the terminal device has been connected with a Bluetooth device and performs scanning during data transmission, it is difficult for the terminal device to transmit data in a corresponding scan window, so that in a case of poor transmission signals and the like, data transmission is more unstable, which will lead to lag. However, in related art, a scan parameter of a Bluetooth scan often uses factory default settings, which makes it difficult to meet different requirements of a user for connection speed and transmission stability in different usage scenarios.

SUMMARY

In a first aspect, a data transmission method is provided. The method includes the following. A scan parameter of a Bluetooth scan is adjusted or/and a data packet of data transmission is adjusted under a condition. Data is transmitted to a target Bluetooth device via Bluetooth according to an adjusted scan parameter or/and an adjusted data packet.

In a second aspect, a non-transitory computer storage medium is provided. The computer storage medium stores multiple instructions which are configured to be loaded by a terminal device to execute the following. A scan parameter of a Bluetooth scan is adjusted or/and a data packet of data transmission is adjusted, upon determining that a preset condition is met. Data is transmitted to a target Bluetooth device via Bluetooth according to an adjusted scan parameter or/and an adjusted data packet.

In a third aspect, a terminal device is provided. The terminal device includes a processor, a memory, and a network interface, where the memory stores a computer program, and the terminal device is configured to execute the following. A scan parameter of a Bluetooth scan is adjusted or/and a data packet of data transmission is adjusted, upon determining that a preset condition is met. Data is transmitted to a target Bluetooth device via Bluetooth according to an adjusted scan parameter or/and an adjusted data packet.

BRIEF DESCRIPTION OF THE DRAWINGS

In order to describe technical solutions of implementations of the present disclosure more clearly, the following will give a brief introduction to the accompanying drawings used for describing the implementations. Apparently, the accompanying drawings hereinafter described are some implementations of the present disclosure. Based on these drawings, those of ordinary skill in the art can also obtain other drawings without creative effort.

DETAILED DESCRIPTION

In order to make purposes, technical solutions, and advantages of the present disclosure clearer, implementations of the present disclosure will be described in further detail below with reference to accompanying drawings.

When accompanying drawings are referred to in following description, same numerals in different accompanying drawings refer to the same or similar elements unless otherwise indicated. Implementations described in following illustrative implementations are not intended to represent all implementations consistent with this disclosure. Rather, they are merely examples of apparatus and methods consistent with some aspects of the present disclosure as recited in appended claims.

In description of the present disclosure, it should be understood that the terms "first", "second" and the like are used for only describing purposes, and should not be understood as indicating or implying relative importance. For those skilled in the art, specific meanings of the above terms in this disclosure can be understood in specific situations. In addition, in the description of the present disclosure, unless otherwise specified, "multiple" means two or more. "And/or" describes an association relationship of associated objects, which means that three kinds of relationships may exist, for example, A and/or B can mean three situations that A exists alone, A and B exist at the same time, and B exists alone. The character "/" generally indicates that associated objects before and after "/" have a relationship of "or". The data transmission method provided in implementations of the present disclosure will be described in detail below with reference to FIG. 1 to FIG. 10. The method can be implemented with the aid of a computer program, which can be run on a data transmission apparatus based on a von Neumann system. The computer program can be integrated into an application or run as an independent tool application. The data transmission apparatus in implementations of the present disclosure may be a terminal device, and the terminal device includes but is not limited to: a smart phone, a personal computer, a tablet computer, a handheld device, on-board equipment, a wearable device, a computing device, or other processing devices connected with a wireless modem, etc.

When the terminal device has been connected with a Bluetooth device and a Bluetooth scan function is started, it is difficult or unable for the terminal device to transmit data in a corresponding scan window, so that in a case of poor transmission signals and the like, data transmission is more unstable, which will lead to lag. A data transmission method is provided, which can meet different requirements of a user for the speed of a Bluetooth connection and stability of data transmission in different usage scenarios by adjusting a can parameter of a Bluetooth scan. A technical solution will be described below specifically.

Figure 1:
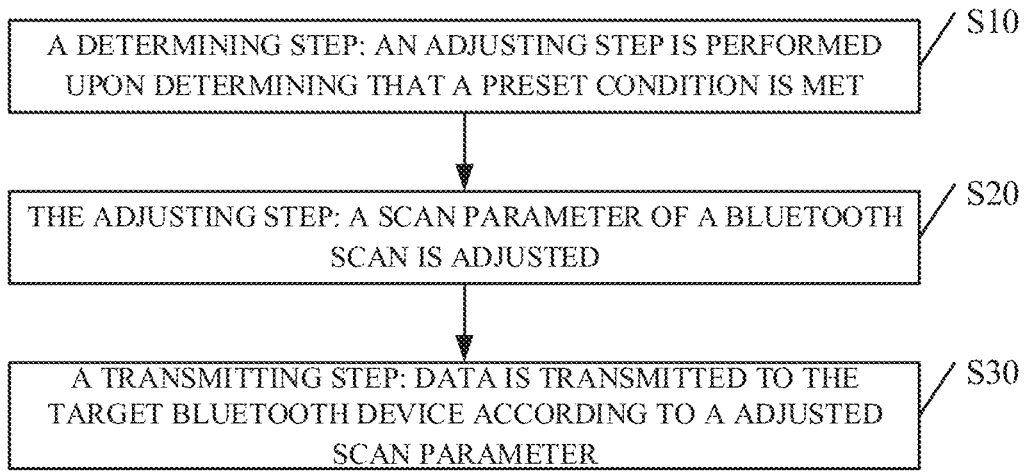
FIG. 1 is a schematic flow chart of a data transmission method provided in implementations of the present disclosure.

Reference can be made to FIG. 1, which is a schematic flow chart of a data transmission method provided in implementations of the present disclosure. For illustrated purpose, a scan parameter is adjusted, as illustrated in FIG. 1, the method in implementations of the present disclosure may include following steps.

At S10, a determining step: an adjusting step is performed upon determining that a preset condition is met.

The preset conditions can be set according to requirements of a user for stability of data transmission and speed of being discovered by other devices and establishing a Bluetooth connection in actual application scenarios.

In one case, due to, for example, an interference of a signal such as Wi-Fi which is in the same frequency band as Bluetooth, a transmission distance, or transmission blocking, etc., a Bluetooth signal may be greatly interfered by the environment. In this case, an environmental interference value can be used for description. When the environmental interference value is large, a Bluetooth signal will be affected, thereby affecting Bluetooth data transmission, so stability of data transmission can be improved by the adjusting step. In some implementations, when the environmental interference value of data transmission from the terminal device to a target Bluetooth device is determined to meet a threshold condition, the adjusting step is performed. The environmental interference value can be reflected by a received signal strength indicator (RSSI) value, or can be reflected by a packet-loss situation. For example, before the environmental interference value of data transmission from the terminal device to the target Bluetooth device is determined to meet the threshold condition, the following can be further included. The number of times of package loss of data transmission from the terminal device to the target Bluetooth device via Bluetooth is determined. When the number of times of package loss of data transmission from the terminal device to the target Bluetooth device via Bluetooth is determined to be greater than a preset value, the environmental interference value is determined to meet the threshold condition, where the preset value is an integer greater than or equal to 1. Of course, a case that the environmental interference value is determined to meet the threshold condition as long as package loss occurs is also included in the above implementations. For another example, when the RSSI value of data transmission is less than a preset value, the environmental interference value is determined to meet the threshold condition, and the adjusting step can be performed.

In another case, when multimedia data such as at least one of audio data or video data needs to be transmitted, higher stability of data transmission is required thereby ensuring real-time transmission. In some implementations, when it is determined that the terminal device needs to transmit multimedia data to the target Bluetooth device, the adjusting step can be performed. Further, the preset condition can also be determined according to importance and real-time of data to be transmitted, the solution can even be manually triggered for adjustment when the user feels lagging.

The above are scenarios in which transmission stability needs to be ensured. In some scenarios, the user may prefer the speed of Bluetooth connection, so adjustment can be performed as needed. For example, after multimedia data transmission is completed, adjust back to a default Bluetooth scan parameter.

It should be noted that the default Bluetooth scan parameter can be set in a manner commonly used in related art when leaving the factory, or the default Bluetooth scan parameter can be set in a manner disclosed in the present disclosure that is beneficial to stability of data transmission, and adjustment can be performed according to usage scenarios (the preset condition) in practice, and the above manners are all included in the protection scope of the present disclosure.

At S20, the adjusting step: a scan parameter of a Bluetooth scan is adjusted.

The scan parameter includes a part or all of the following: a scan-window duration (e.g. a scan type), or start time of a first scan-window corresponding to an inquiry scan and start time of a second scan-window corresponding to a page scan. It should be understood that, when a Bluetooth module of the terminal device is enabled, the scan parameter of the Bluetooth scan can be adjusted, such that the Bluetooth module can perform the Bluetooth scan according to an adjusted scan parameter. For example, the first scan-window refers to a scan window of the inquiry scan, and the second scan-window refers to a scan window of the page scan. In other implementations, the first scan-window may refer to a scan window of the page scan, and the second scan-window may refer to a scan window of the inquiry scan, which is not limited herein.

In some implementations, the scan-window duration of the Bluetooth scan can be adjusted by adjusting a scan type of the Bluetooth scan from an interlaced scan to a standard scan.

It should be noted that, when the scan-window duration is adjusted to be shorter, scan time becomes shorter, so that time for data transmission is correspondingly increased, and data transmission is more stable. For example, the scan type of the Bluetooth scan is adjusted from the interlaced scan to the standard scan, thereby reducing the scan time by half. Of course, if it is not limited to conventions of the standard Bluetooth protocol, the scan-window duration can also be reduced according to other custom rules. How much to adjust can be based on actual needs which balance stability of data transmission and a requirement for allowing other Bluetooth to be connected with.

In some implementations, the start time of the first scan-window corresponding to the inquiry scan and the start time of the second scan-window corresponding to the page scan can be adjusted by setting the start time of the first scan-window corresponding to the inquiry scan and the start time of the second scan-window corresponding to the page scan to be the same or differ by a first preset time threshold.

In this implementation, since the inquiry scan and the page scan can be performed simultaneously or not, that is, start time of scan-windows of these two scans can be the same or different, in order to ensure stability of data transmission, especially when multimedia data is transmitted, a possibility that a scan window of the inquiry scan (i.e., the first scan-window) and a scan window of the page scan (i.e., the second scan window) are partially overlapped or continuous needs to be reduced even to zero, where that the first scan window and the second scan window are partially overlapped or continuous may cause problems such as lag due to failure of data transmission for a long time interval. To this end, in some implementations, the start time of the first scan window and the start time of the second scan window are set to be the same, especially when durations of two scan windows are the same, which makes two scan windows completely overlapped. Further, if the scan-window duration is also shortened, time required for the scan will be further reduced, thereby leaving more time for data transmission and ensuring transmission stability. In some implementations, the start time of the first scan-window corresponding to the inquiry scan and the start time of the second scan-window corresponding to the page scan are set to differ by the first preset time threshold, and the first preset time threshold can make two scan windows not overlapped. For example, the start time of the second scan-window is later than an end of the first scan-window duration by a second preset time threshold. For example, a sum (i.e. the first preset time threshold) of the second preset time threshold and the first scan-window duration is greater than or equal to time required for an audio end to pack and transmit one audio data package to a Bluetooth transceiver module for buffering, in this way, it can be ensured that, if the Bluetooth scan is performed immediately after a package of data is transmitted via Bluetooth, there is enough time to buffer one data package, and an interval (i.e., an interval from the end of the first scan-window to the beginning of the second scan-window) between two scan windows is sufficient for at least one packet of data to be transmitted via Bluetooth. For another example, the second preset time threshold is greater than or equal to time required for transmission of one data package, so as to ensure that at least one packet of data can be transmitted between two scan windows, so as to avoid lag caused by failure of data transmission for a long time.

If package loss caused by severe environmental interference occurs during data transmission, it is necessary to wait for a long scan time for retransmission. After a scan is completed, retransmission is performed. A time interval between a retransmitted data package and a last data package is longer. When a next data package continues to be transmitted, there is no need to wait for scanning. A time interval between the next data package and the retransmitted data package becomes shorter. During the entire transmission process, transmissions intervals between adjacent two data packages are sometimes long and sometimes short, which reduces the stability of data transmission. Through the above implementations, the problem of unstable data transmission can be solved.

At S30, a transmitting step: data is transmitted to the target Bluetooth device according to an adjusted scan parameter.

Here, the data that is transmitted according to the adjusted scan parameter may be at least one of video data or audio data.

The Bluetooth module performs the Bluetooth scan according to an adjusted scan parameter, and transmits data to the target Bluetooth device during rest time of the Bluetooth scan window. The Bluetooth scan parameter can be adjusted according to usage scenarios (the preset condition), which can meet requirements of the user in different usage scenarios, and can guarantee stability of data transmission especially when important data needs to be transmitted.

In order to further ensure stability of data transmission, a data packet of data transmission can also be adjusted, and the data packet includes a payload and/or a data code rate. In some implementations, the scan parameter and the data packet may be adjusted together, which fully considers a comprehensive influence of the scan parameter, the payload, and the data transmission code rate on stability of data transmission. For example, a reasonable payload value is set during a scan window, so that during a period without data transmission, a data package matching the payload value is generated and waits for transmission, and the data package can be transmitted immediately after the end of scan window without waiting, thereby further reducing packet transmission interval between two adjacent data packages, and guarantee the stability of data transmission effectively. Adjusting the data packet of data transmission in implementations of the present disclosure may mean adjusting a packet type of data transmission. Data packets with of packet types may correspond to different payloads and different data code rates, where the data code rate can be a theoretical value with retransmission being not considered.

In implementations of the present disclosure, when the preset condition is determined to be met, the scan parameter of the Bluetooth scan is adjusted, and data is transmitted to the target Bluetooth device via Bluetooth according to the adjusted scan parameter. By adjusting the scan parameter of the Bluetooth scan, data transmission can be performed only after waiting for a short scan time, and a transmission interval between two adjacent data packages is shorter, which can improve stability of data transmission and solve a problem of lag. Different requirements of the user for the speed Bluetooth connection and stability of data transmission in different usage scenarios can be met by adjusting the scan parameter of the Bluetooth scan.

Figure 2:
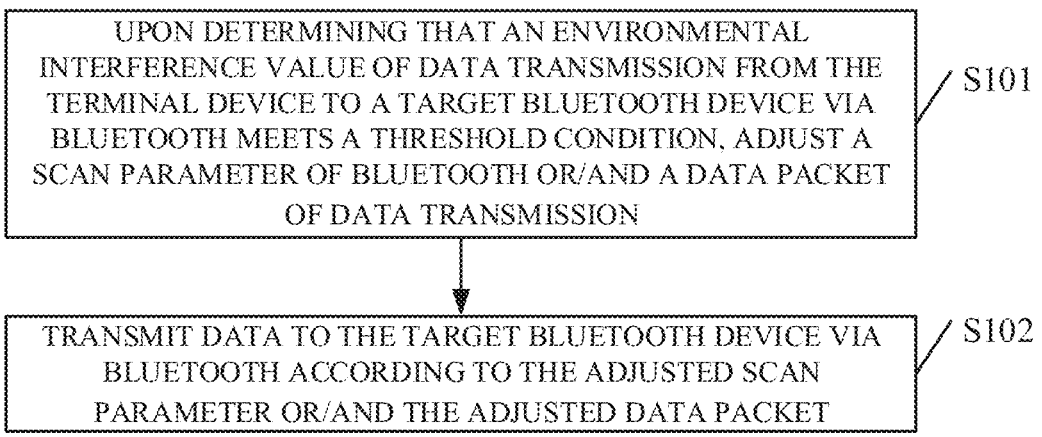
FIG. 2 is a schematic flow chart of a data transmission method provided in implementations of the present disclosure.

Reference is made to FIG. 2, which is a schematic flow chart of a data transmission method provided in implementations of the present disclosure. For illustrative purpose, the preset condition is, for example, an environmental interference value, and the scan parameter or/and the data packet of data transmission is adjusted. As illustrated in FIG. 2, the method in implementations in the present disclosure includes the following.

At S101, upon determining that an environmental interference value of data transmission from the terminal device to a target Bluetooth device via Bluetooth meets a threshold condition, a scan parameter of a Bluetooth scan or/and a data packet of data transmission is adjusted.

Figure 3:
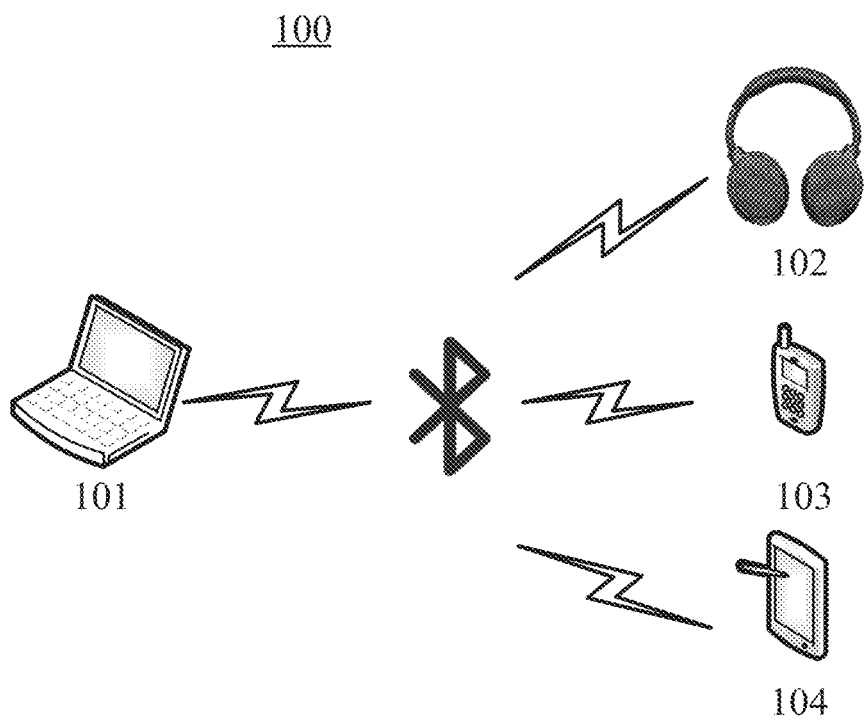
FIG. 3 is a schematic structural diagram of a data transmission system provided in implementations of the present disclosure.

Data is transmitted between the terminal device and the target Bluetooth device via Bluetooth, and a corresponding system architecture is as illustrated in FIG. 3. The system architecture 100 may include a terminal device 101, a Bluetooth network, and one or more of Bluetooth devices 102, 103, and 104. The Bluetooth network is used to provide a medium for communication links between the terminal device 101 and the Bluetooth devices 102, 103 and 104.

Bluetooth is a radio technology that supports a short-range communication (generally within 10 m) of devices, via which wireless information can be exchanged among multiple devices including a mobile phone, a PDA, a wireless headset, a notebook computer, and related peripherals. With the Bluetooth technology, a communication between terminal devices can be simplified effectively, and a communication between a device and Internet can also be simplified successfully, so that data transmission becomes more rapid and efficient, and a road for wireless communication is widened.

It should be understood that the number of the terminal device and the number of Bluetooth devices in FIG. 3 are only illustrative. Any number of electronic devices and Bluetooth devices can be included according to depending on implementation requirements. For example, the Bluetooth device 102 may be a Bluetooth device cluster composed of multiple Bluetooth devices or multiple independent Bluetooth devices within a certain distance range.

The user can use the terminal device 101 to interact with the Bluetooth devices 102, 103, and 104 through the Bluetooth network for messages receiving and transmitting, and the like. The terminal device 101 can be various electronic devices with display screens, which includes but is not limited to a smart phone, a tablet computer, a portable computer, a desktop computer, a Bluetooth headset, Bluetooth on-board equipment, a Bluetooth headset, a Bluetooth MP3, a Bluetooth flash drive, a Bluetooth adapter, a Bluetooth Gateway, a Bluetooth CF card, etc. The Bluetooth device may include but is not limited to a smart phone, a tablet computer, a portable computer, a desktop computer, a Bluetooth headset, Bluetooth on-board equipment, a Bluetooth headset, a Bluetooth MP3, a Bluetooth flash drive, a Bluetooth adapter, a Bluetooth Gateway, a Bluetooth CF card, etc.

In implementations of the present disclosure, for example, the terminal device 101 transmits data to the Bluetooth device 102. The data may be audio data, which is transmitted in the form of data packages. The data packages are transmitted in default ACL data packet (e.g. 2-DH5). Each kind of a data packet specifies a different payload and different transmission code rate.

It should be noted that, during data transmission, the terminal device also simultaneously enables a Bluetooth scan function. The Bluetooth scan function includes an inquiry scan and a page scan.

The inquiry scan indicates that the Bluetooth device is in a discoverable state. In this state, the Bluetooth device scans inquiry requests from other Bluetooth devices and can be discovered by other devices, and information such as a Bluetooth name can be obtained from the Bluetooth device.

The page scan indicates that Bluetooth device is in a connectable state. In this state, the Bluetooth device scans and obtains connection requests from other devices.

Figure 4:
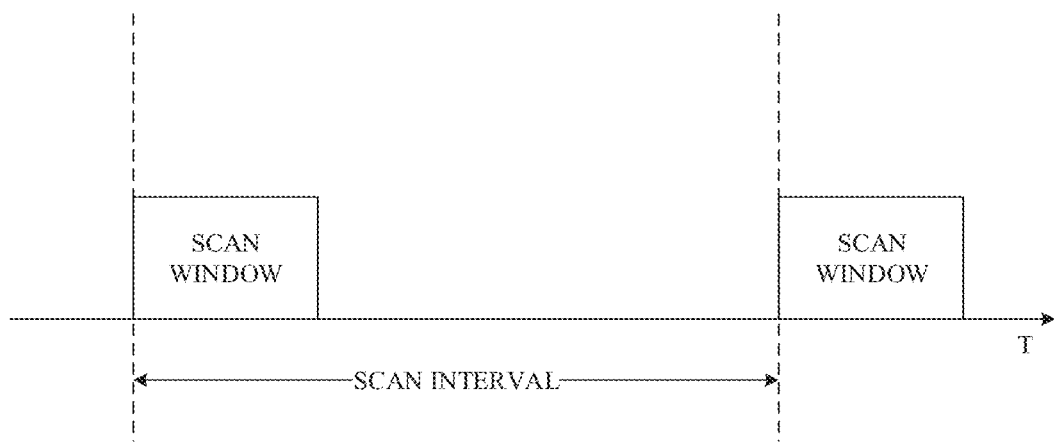
FIG. 4 is a schematic diagram of an exemplary scan window provided in implementations of the present disclosure.

Each Bluetooth scan will last for a period of time, that is, each scan corresponds to a scan window. The scan window is a time width of one scan, and the scan window is divided into an inquiry scan window and a page scan window. However, data transmission is unable to be performed during the scan window. A scan interval is a time difference between start times of two consecutive scan windows. As illustrated in FIG. 4, the scan interval includes rest time of scanning and time of scanning. The two consecutive scan windows may mean two neighboring scan windows with or without the rest time of scanning therebetween. FIG. 4 illustrates an example of two consecutive scan windows with the rest time of scanning therebetween. In other implementations, there may be no rest time of scanning between wo consecutive scan windows.

No matter for the inquiry scan or the page scan, two types of scans which are a standard scan and an interlaced scan are included, and an actual scan window of the interlaced scan is twice that of the standard scan.

For example, determine whether the number of times of package loss of data transmission from the terminal device to the target Bluetooth device via Bluetooth is greater than a preset value, where the preset value is an integer greater than or equal to 1. If the number of times is greater than the preset value, it indicates that a probability of package loss during data transmission is high or package loss has occurred. If package loss occurs, a data package needs to be retransmitted. If Bluetooth of the terminal device is enabled, a scan type of Bluetooth is adjusted from the interlaced scan to the standard scan to reduce scan time; or the first scan-window corresponding to the inquiry scan and the second scan-window corresponding to the page scan are set to be not partially overlapped, that is, the start time of the first scan-window corresponding to the inquiry scan and the start time of the second scan-window corresponding to the page scan are set to be the same or differ by a first preset time threshold, to avoid increase of time during which data is unable to be transmitted due to the first scan-window and the second scan-window being partially overlapped or continuous. As such, data transmission time can be increased. Or the scan type of the Bluetooth scan is adjusted from the interlaced scan to the standard scan, and the start time of the first scan-window corresponding to the inquiry scan and the start time of the second scan-window corresponding to the page scan are set to be the same or differ by a first preset time threshold. In addition, the data packet of data transmission can also be adjusted from a first data packet to a second data packet, where a first payload corresponding to the first data packet is larger than a second payload corresponding to the second data packet, and/or a first data code rate corresponding to the first data packet is greater than a second data code rate corresponding to the second data packet. If the Bluetooth scan of the terminal device is not enabled, the data packet of data transmission can be adjusted from the first data packet to the second data packet, where the first payload corresponding to the first data packet is larger than the second payload corresponding to the second data packet, and/or the first data code rate corresponding to the first data packet is greater than the second data code rate corresponding to the second data packet, so that the payload and the transmission code rate can be reduced, thereby shortening a packet transmission interval between adjacent (or neighboring) data packages, and increasing packet transmission frequency. Of course, if it is not limited to conventions of the standard Bluetooth protocol, the scan-window duration can also be reduced according to other custom rules. How much to adjust can be based on actual needs which balance stability of data transmission and a requirement for allowing other Bluetooth to be connected with. Of course, the scan type, a scan period, and the data packet can also be adjusted at the same time, and adjustment can be made by integrating various manners which cooperate with each other.

It should be noted that the target Bluetooth device includes a storage space. When the storage space is filled up with data packages transmitted from the terminal device to the target Bluetooth device, the target Bluetooth device reads and plays each data package in turn. Simultaneously, the Bluetooth device continues to transmits remaining packages to the target Bluetooth device.

Figure 5:
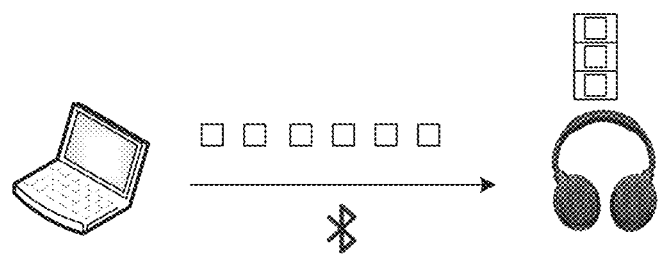
FIG. 5 is a schematic diagram of an exemplary data-package transmission provided in implementations of the present disclosure.

For example, as illustrated in FIG. 5, the target Bluetooth device can cache three data packages. After the terminal device transmits three data packages to the target Bluetooth device, the target Bluetooth device starts to read the first data package, and at the same time, the terminal device continues to transmit the fourth data package to the target Bluetooth device.

At S102, data is transmitted to the target Bluetooth device via Bluetooth according to an adjusted scan parameter or/and an adjusted data packet.

Here, the data that is transmitted according to the adjusted scan parameter may be at least one of video data or audio data.

For example, scan for a Bluetooth device by using the standard scan and transmit the data by using the first data packet to the target Bluetooth device via Bluetooth; scan for a Bluetooth device by using the interlaced scan and transmit the data by using the second data packet to the target Bluetooth device via Bluetooth; or scan for a Bluetooth device by using the standard scan and transmit the data by using the second data packet to the target Bluetooth device via Bluetooth.

The scan time can be reduced or a packet transmission frequency can be increased by using any of the above manners, so that the target Bluetooth device can receive data packages more quickly for playback, time intervals between adjacent data packages are more uniform, data package transmission is more stable, and lag is avoided.

In implementations of the present disclosure, upon determining that the environmental interference value of data transmission from the terminal device to the target Bluetooth device via Bluetooth meets the threshold condition, the scan parameter of the Bluetooth scan is adjusted or/and the data packet of data transmission is adjusted, and data is transmitted to a target Bluetooth device via Bluetooth according to the adjusted scan parameter or/and the adjusted data packet. In one aspect, by adjusting the scan parameter of the Bluetooth scan, data transmission can be performed only after waiting for a short scan time, and a transmission interval between two adjacent data packages is shorter. In another aspect, by adjusting the data packet of data transmission, a transmission code rate is lower, the transmission time interval between two adjacent data packages is shorter, and a packet transmission frequency is higher. These two aspects can also be combined, which can significantly improve stability of data transmission. Retransmitted data can also be read by the target Bluetooth device more quickly to avoid lag.

Figure 6:
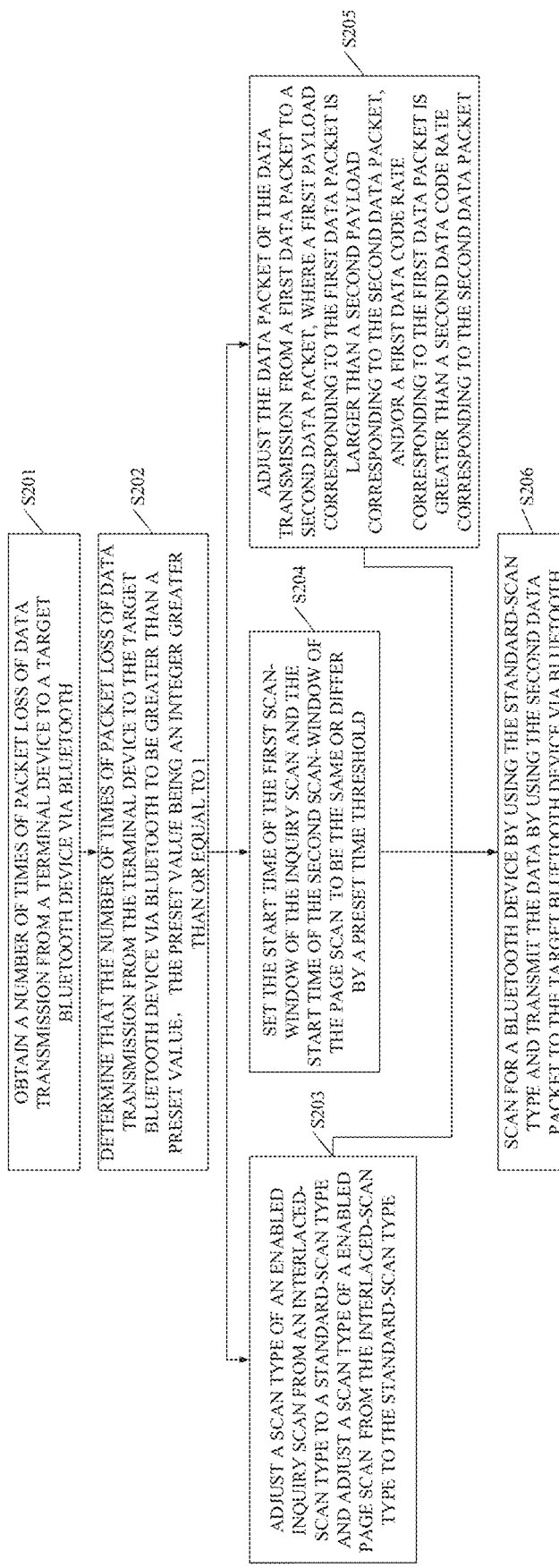
FIG. 6 is a schematic flow chart of a data transmission method provided in implementations of the present disclosure.

Reference is made to FIG. 6, which is a schematic flow chart of a data transmission method provided in implementations of the present disclosure. For illustrative purpose, both a scan parameter and a data packet are adjusted. The data transmission method includes the following.

At S201, a number of times of package loss of data transmission from a terminal device to a target Bluetooth device via Bluetooth is obtained.

Data transmitted from the terminal device to a Bluetooth device may be audio data, and the audio data is transmitted in the form of data packages.

During transmission of the data packages, package loss may occur due to environmental interference and a low signal-to-noise ratio, so that a data package fails to reach a destination.

The audio data is transmitted via Bluetooth. Bluetooth is a radio technology that supports a short-range communication (e.g., within 10 m) of devices, via which wireless information can be exchanged among multiple devices including a mobile phone, a PDA, a wireless headset, a notebook computer, and related peripherals. With the Bluetooth technology, a communication between terminal devices can be simplified effectively, and a communication between a device and Internet can also be simplified successfully, so that data transmission becomes more rapid and efficient, and a road for wireless communication is widened.

In some implementations, every time the terminal device transmits a data package to the target Bluetooth device, the target Bluetooth device will feed back a response message to the terminal device after successfully receiving the data package, indicating that the data package was successfully transmitted. If no response message is received within a preset time period after a packet is transmitted, it indicates that package loss occurs. Further, when the package loss is detected once, the number of package loss is increased by 1 accordingly.

At 202, the number of times of package loss of data transmission from the terminal device to the target Bluetooth device via Bluetooth is determined to be greater than a preset value.

The preset value is an integer greater than or equal to 1. In other words, as long as package loss is detected, adjustment of the scan parameter and the data packet can be performed.

At 203, a scan type of an inquiry scan is adjusted from an interlaced scan to a standard scan and a scan type of a page scan is adjusted from the interlaced scan to the standard scan.

At present, the terminal device can be connected with multiple Bluetooth devices at the same time (for example, when a mobile phone is connected with a Bluetooth headset to play games, the Bluetooth gamepad can also be connected with the mobile phone), which requires the terminal device to keep the inquiry scan and the page scan enabled all the time, so as to be discovered by and connected with other Bluetooth Devices.

The terminal device searches for nearby Bluetooth devices by inquiring. The terminal device (i.e., an inquiring device) selects a new frequency for inquiry transmission every 312.5 microseconds, and the Bluetooth device (i.e., a device to be inquired) selects a new listening frequency every 1.28 s. The inquiring device and the device to be inquired use a general inquiry access code (GIAC) as an inquiring address.

The terminal device calls other devices to join its piconet by paging. A paging device (i.e. the terminal device) selects a new frequency for page transmission every 312.5 microseconds, and during the page scan, a device to be paged selects a new listening frequency every 1.28 s.

Figure 7:
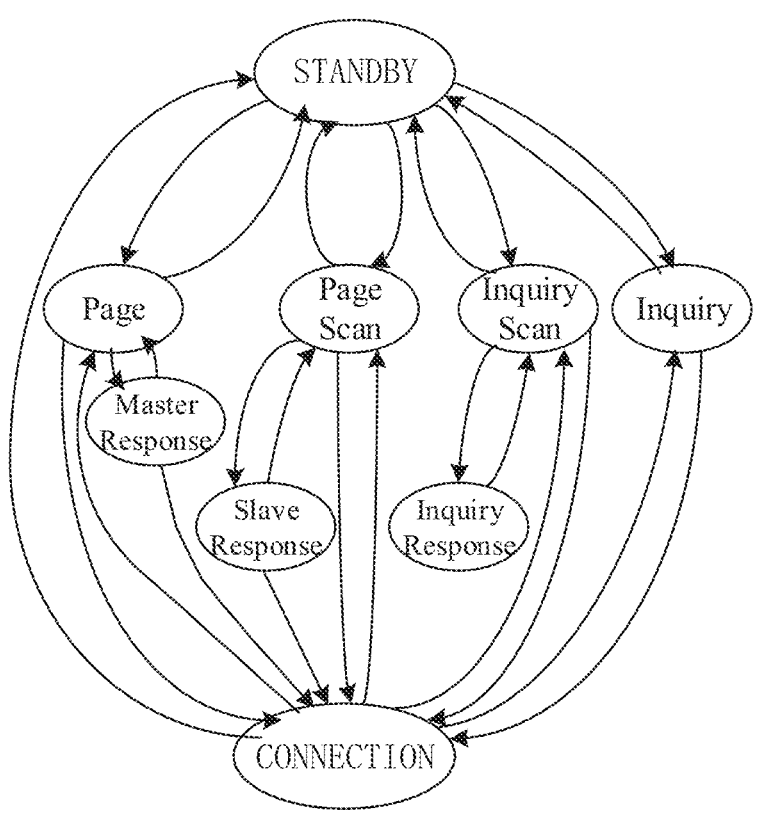
FIG. 7 is a schematic diagram of a principle of transition of Bluetooth states provided in implementations of the present disclosure.

FIG. 7 is a diagram illustrating transition of Bluetooth states, where STANDBY state is a default state of the terminal device. In this mode, the device is in a low power state. CONNECTION state is a connection state of the terminal device.

Page: this sub-state is so-called a connection (page), and operations of a slave corresponding to a connection/activation is called a page. It means that a device that initiates a connection (i.e., a master device) knows the address of a device to be connected with, and page can be performed directly.

Page scan: this sub-state corresponds to the page, and is a state of the slave which waits to be paged. If the slave wants to be paged, the slave should be in the page scan state.

Inquiry: this is a scan state, and a device in this state scans nearby devices. The device does not know what devices are nearby, and needs to inquire through broadcasting. A device in an inquiry scan state can respond to this inquiry.

It should be noted that after inquiry, a device can be connected without entering the Page.

Inquiry scan: a state of a discoverable device that is generally seen. It is reflected in an upper layer that, we can click on the device in an Android system to make the device able to be discovered by nearby devices, and the device is in such a state.

Slave response: during Page, a slave receives a page message from a master, the slave will feed back a corresponding page response message, and at the same time enters a slave response state.

Master response: after the master receives a slave response message, the master will enter a master response state, and will transmit an FHS packet at the same time.

Inquiry response: after the device in the inquiry scan state receives an inquiry message, the device transmits a message of an inquiry response, and then will enter an inquiry response state.

In the process of transmitting audio data from the terminal device to the target Bluetooth device, the inquiry scan and the page scan are enabled synchronously to make the terminal device discoverable and connectable for other Bluetooth devices.

Figure 8:
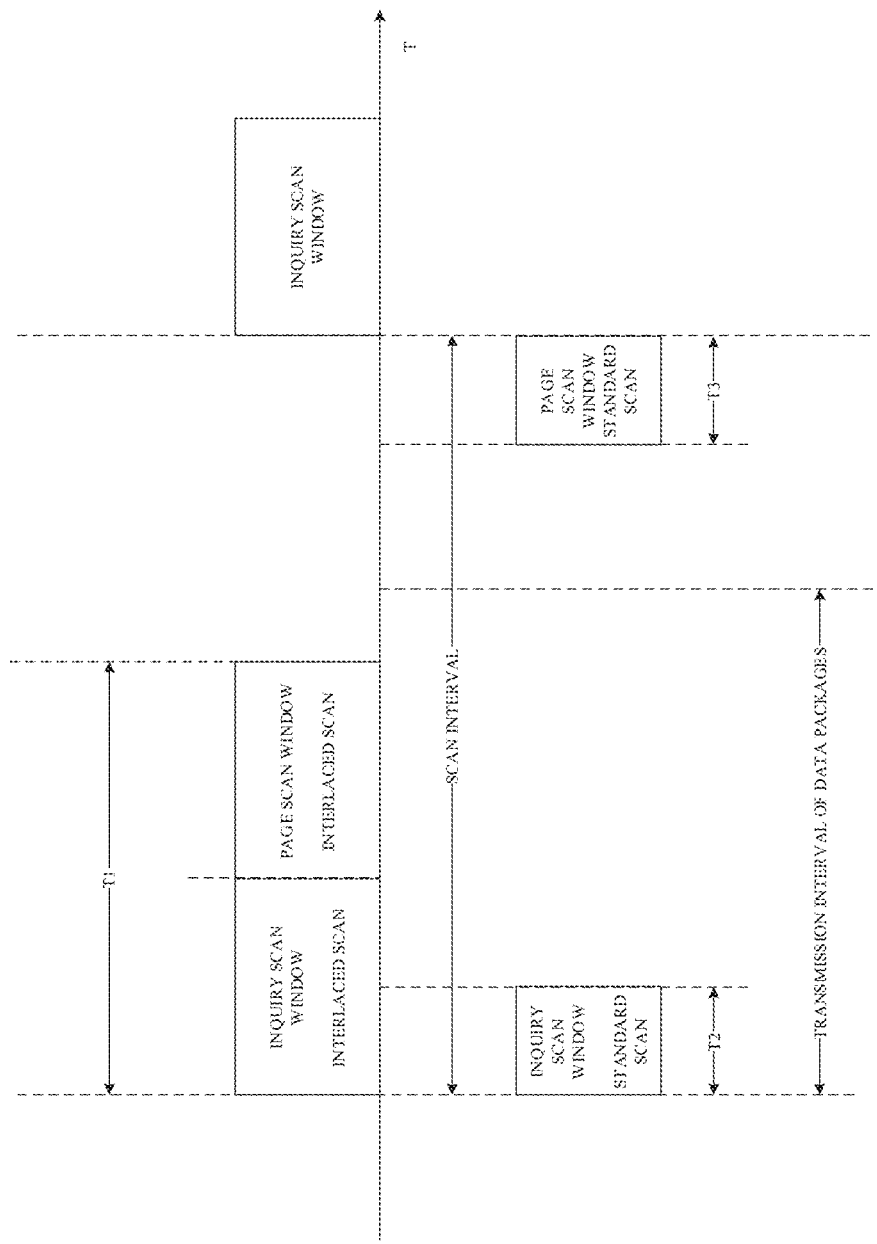
FIG. 8 is a schematic diagram of a comparison between before and after scan parameter adjustment provided in implementations of the present disclosure.

For example, when it is determined that package loss occurs, a data package needs to be retransmitted, and data transmission is unable to be performed during the scan window. In fact, each Bluetooth scan will last for a period of time. In order to make discovery and connection faster, the terminal device usually uses the interlaced scan to scan by default, as illustrated in FIG. 8. The scan time of the interlaced scan is twice that of the standard scan. When the interlaced scan is used in both the inquiry scan and the page scan, data is unable to be transmitted for a long time in one scan period. In order to reduce Bluetooth scan time, the scan type of the inquiry scan is adjusted from the interlaced scan to the standard scan, and the scan type of the page scan is adjusted from the interlaced scan to the standard scan. Of course, if it is not limited to conventions of the standard Bluetooth protocol, the scan-window duration can also be reduced according to other custom rules. How much to adjust can be based on actual needs which balance stability of data transmission and a requirement for allowing other Bluetooth to be connected with.

At S204, the start time of the first scan-window corresponding to the inquiry scan and the start time of the second scan-window corresponding to the page scan are set to be the same or differ by a first preset time threshold.

The start time of the first scan window and the start time of the second scan window are set to be the same, especially when durations of two scan windows are the same, which makes two scan windows completely overlapped. Further, if the scan-window duration is also shortened, time required for the scan will be further reduced, thereby leaving more time for data transmission and ensuring transmission stability. In some implementations, the start time of the first scan-window and the start time of the second scan-window are set to differ by the first preset time threshold, and the first preset time threshold can make two scan windows not partially overlap, that is the first scan-window and the second scan-window are completely overlapped or non-continuous. For example, the term "non-continuous" means that an end of the first scan-window and the start time of the second scan-window differ by a period of time, when the start time of the second scan-window is later than the end of the first scan-window duration.

Generally, the inquiry scan is adjacent (or neighboring to) to the page scan, as illustrated in FIG. 8, then a scan duration in one period is T1. After the first scan-window corresponding to the inquiry scan and the second scan-window corresponding to the page scan are set to differ, $T2=\frac{1}{4}T1$, $T3=\frac{1}{4}T1$. After the inquiry scan ends and before the page scan starts, transmission data can reach the target Bluetooth device, and time without transmission between two data packages is $\frac{1}{4}T1$.

At S205, the data packet of the data transmission is adjusted from a first data packet to a second data packet, where a first payload corresponding to the first data packet is larger than a second payload corresponding to the second data packet, and/or a first data code rate corresponding to the first data packet is greater than a second data code rate corresponding to the second data packet.

In addition, by adjusting the data packet of data transmission, transmission time interval between data packages is changed, and then a packet transmission frequency is changed.

For example, in a ACL data packet list as illustrated in Table 1, various types of data packets are defined. Before adjusting the data packet, if a 2-DH5 data packet is used by default to transmit data, the corresponding first payload is 0-679 bytes, and the first data code rate is 869.1 kb/s. After the data packet is adjusted to 2-DH3, the corresponding second payload is 0-367 bytes, and the second data code rate is 782.9 kb/s, so that the payload and transmission code rate can be reduced, so that an interval time between data packages is shortened, and the packet transmission frequency is increased.

The payload is a part of the data that records information. Generally during data transmission, in order to make data transmission more reliable, original data will be transmitted in batches, and certain auxiliary information will be added to head and tail of each batch of data, such as the size of this batch of data, a check bit, etc. This is equivalent to adding some coats to the original data in batches, and these coats play a role of marking, so that the original data is not easily lost. A batch of data with its "coat" forms a basic transmission unit in a transmission channel, which is called a data frame or a data package. Original data that records information in these data frames is the payload, and a message body is the "coat", which is auxiliary information marking the size of the original data, etc.

TABLE 1

| Type | Payload Header (bytes) | User Payload (bytes) | FEC | MIC | CRC | Symmetric Max. Rate (kb/s) | Asymmetric Max. Rate (kb/s) | |
|---|---|---|---|---|---|---|---|---|
| | | | | | | | Forward | Reverse |
| DM1 | 1 | 0-17 | 2/3 | C.1 | Yes | 108.8 | 108.8 | 108.8 |
| DH1 | 1 | 0-27 | No | C.1 | Yes | 172.8 | 172.8 | 172.8 |
| DM3 | 2 | 0-121 | 2/3 | C.1 | Yes | 258.1 | 387.2 | 54.4 |
| DH3 | 2 | 0-183 | No | C.1 | Yes | 390.4 | 585.6 | 86.4 |
| DM5 | 2 | 0-224 | 2/3 | C.1 | Yes | 286.7 | 477.8 | 36.3 |
| DH5 | 2 | 0-339 | No | C.1 | Yes | 433.9 | 723.2 | 57.6 |
| 2-DH1 | 2 | 0-54 | No | C.1 | Yes | 345.6 | 345.6 | 345.6 |
| 2-DH3 | 2 | 0-367 | No | C.1 | Yes | 782.9 | 1174.4 | 172.8 |
| 2-DH5 | 2 | 0-679 | No | C.1 | Yes | 869.1 | 1448.5 | 115.2 |
| 3-DH1 | 2 | 0-83 | No | C.1 | Yes | 531.2 | 531.2 | 531.2 |
| 3-DH3 | 2 | 0-552 | No | C.1 | Yes | 1177.6 | 1766.4 | 235.6 |
| 3-DH5 | 2 | 0-1021 | No | C.1 | Yes | 1306.9 | 2178.1 | 177.1 |

At S206, scan for a Bluetooth device by using the standard scan and transmit the data by using the second data packet to the target Bluetooth device via Bluetooth.

For example, by using the standard scan to scan the Bluetooth device and using the second data packet to transmit the data to the target Bluetooth device, the scan time can be reduced and the packet transmission frequency can be increased, so that the target Bluetooth device can receive data packages more quickly for playback, time intervals between adjacent data packages are more uniform, and data package transmission is more stable.

In some implementations, if the terminal device has been connected with the target Bluetooth device and plays at least one of audio data or video data, and the terminal device is not allowed to be discovered by or connected with other Bluetooth devices, then the inquiry scan or the page scan can be disabled, so that data transmission is more stable.

In implementations of the present disclosure, upon determining that the number of times of package loss of data transmission from the terminal device to the target Bluetooth device via Bluetooth to be greater than the preset value, the scan parameter of the Bluetooth scan and a data packet of data transmission are adjusted, and data is transmitted to the target Bluetooth device via Bluetooth according to the adjusted scan parameter and the adjusted data packet. In one aspect, by adjusting the scan parameter of the Bluetooth scan, data transmission can be performed only after waiting for a short scan time, and a transmission interval between two adjacent data packages is shorter, such that stability of data transmission can be improved. In another aspect, by adjusting the data packet of data transmission according to an environmental interference, a transmission code rate is lower, the transmission time interval between two adjacent data packages is shorter, and a packet transmission frequency is higher. Stability of data transmission can be optimized from multiple angles, and the delay of a whole path can be optimized. In addition, there is no need to ask for help from Bluetooth chip factory, which is simple to be realized and has good universality. Retransmitted data can also be read by the target Bluetooth device more quickly to avoid lag.

In implementation of the present disclosure below, for illustrative purpose, a mobile phone transmits audio-and-video data to a Bluetooth device and enables an inquiry scan and a page scan. The audio-and-video data may mean at least one of audio data or video data.

Figure 9:
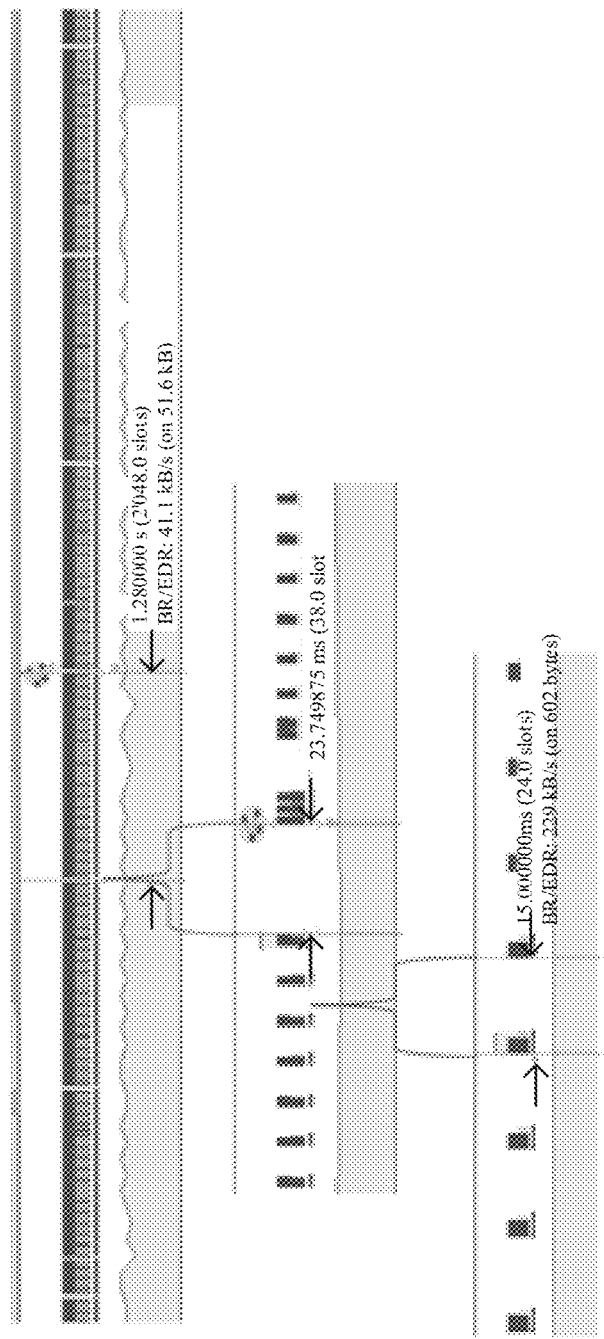
FIG. 9 is a schematic diagram of transmission before scan parameter adjustment provided in implementations of the present disclosure.

In order to make discovery and connection faster, the mobile phone usually use the interlaced scan for scanning. However, during transmission of the audio-and-video data, when the mobile phone performs scanning, the mobile phone is unable to transmit the audio-and-video data in a corresponding scan window. As illustrated in FIG. 9, when a scan interval is set to a default value of 1.28 s, the scan-window duration is set to a default value of 11.25 ms, and the scan type is the interlaced scan, the mobile phone is unable to transmit the audio-and-video data for about 24 ms every 1.28 s.

At the same time, the mobile phone enables both the inquiry scan and the page scan, scan intervals and scan windows of the inquiry scan and the page scan are set to the same generally, and two scan windows are adjacent, therefore in a certain interference environment, it is easy to appear that the peer Bluetooth device is unable to receive the audio-and-video data for more than 40 ms via Bluetooth.

Figure 10:
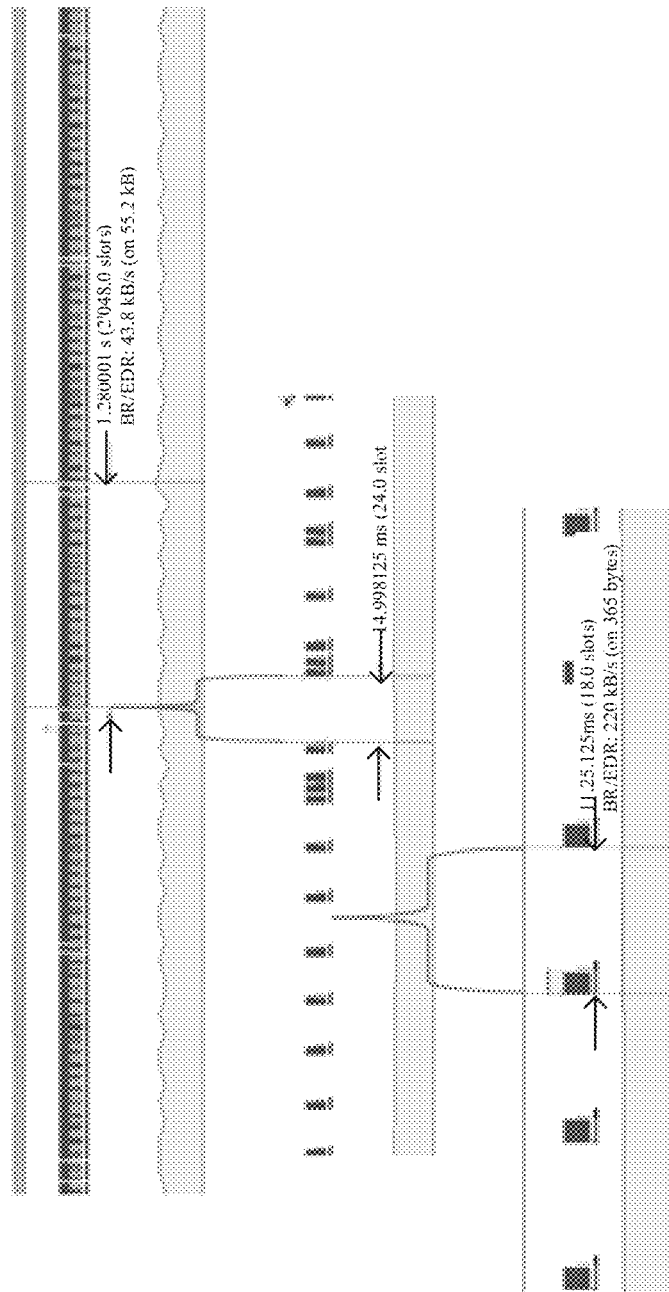
FIG. 10 is a schematic diagram of transmission after scan parameter adjustment provided in implementations of the present disclosure.

Using this solution, the audio-and-video data can be transmitted more evenly via Bluetooth by modifying the data packet (switching from 2-DH5 to 2-DH3) and changing the scan type to standard scan. As illustrated in FIG. 10, the maximum time interval of two adjacent data packages transmitted by the mobile phone is about 15 ms, which is obviously more uniform than data transmission in related art, that is, more stable.

The following are apparatus implementations of the present disclosure, and the apparatus can be used to execute the method implementations of the present disclosure. For details not disclosed in the apparatus implementations of the present disclosure, reference can be made to the method implementations of the present disclosure.

Figure 11:
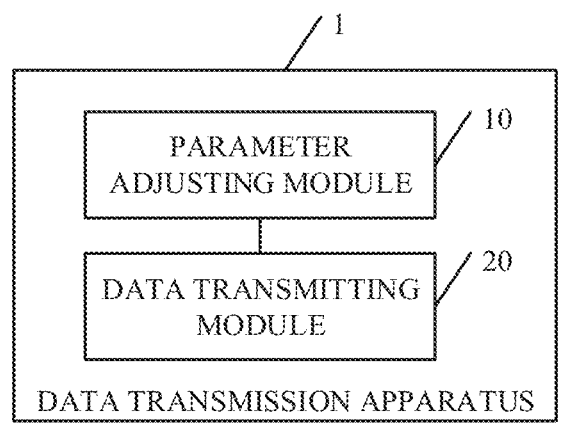
FIG. 11 is a schematic structural diagram of a data transmission apparatus provided in implementations of the present disclosure.

As illustrated in FIG. 11, which is a schematic structural diagram of a data transmission apparatus provided in an exemplary implementation of the present disclosure. The data transmission apparatus can be implemented as a whole or a part of a terminal device by software, hardware, or a combination thereof. The apparatus includes a parameter adjusting module 10 and a data transmitting module 20.

The parameter adjusting module 10 is configured to adjust a scan parameter of a Bluetooth scan or/and adjust a data packet of data transmission, upon determining that a preset condition is met.

The data transmitting module 20 is configured to transmit data to a target Bluetooth device via Bluetooth according to the adjusted scan parameter or/and the adjusted data packet.

In some implementations, the parameter adjusting module 10 is specifically configured to: adjust a scan-window duration of the Bluetooth scan, and/or adjusting start time of a first scan-window and start time of a second scan-window of the Bluetooth scan. In terms of adjusting the scan-window duration of the Bluetooth scan, the parameter adjusting module 10 is specifically configured to adjust a scan type of the Bluetooth scan from an interlaced scan to a standard scan. In terms of adjusting the start time of the first scan-window and the start time of the second scan-window corresponding to the Bluetooth, the parameter adjusting module 10 is specifically configured to set start time of the first scan-window corresponding to an inquiry scan and start time of the second scan-window corresponding to a page scan to be the same or differ by a first preset time threshold.

In some implementations, the parameter adjusting module 10 is specifically configured to: adjust a scan type of the inquiry scan from the interlaced scan to the standard scan when the Bluetooth scan includes the inquiry scan; adjust a scan type of the page scan from the interlaced scan to the standard scan when the Bluetooth scan includes the page scan; or adjust a scan type of the inquiry scan from the interlaced scan to the standard scan and adjusting a scan type of the page scan from the interlaced scan to the standard scan, when the Bluetooth scan includes the inquiry scan and the page scan.

In some implementations, the data packet includes a payload and/or a data code rate, and the parameter adjusting module 10 is specifically configured to adjust the data packet of the data transmission from a first data packet to a second data packet, where a first payload corresponding to the first data packet is larger than a second payload corresponding to the second data packet, and/or a first data code rate corresponding to the first data packet is greater than a second data code rate corresponding to the second data packet.

In some implementations, the data transmitting module 20 is specifically configured to: scan for a Bluetooth device by using the standard scan and transmit the data by using the first data packet to the target Bluetooth device via Bluetooth; scan for a Bluetooth device by using the interlaced scan and transmit the data by using the second data packet to the target Bluetooth device via Bluetooth; or scan for a Bluetooth device by using the standard scan and transmit the data by using the second data packet to the target Bluetooth device via Bluetooth.

In some implementations, the condition includes at least one of: an environmental interference value of data transmission from the terminal device to the target Bluetooth device via Bluetooth meets a threshold condition, the terminal device needs to transmit multimedia data to the target Bluetooth device via Bluetooth; a triggering operation is received from a user; or the terminal device is in a target usage scenario, the target usage scenario at least including a game scenario.

Figure 12:
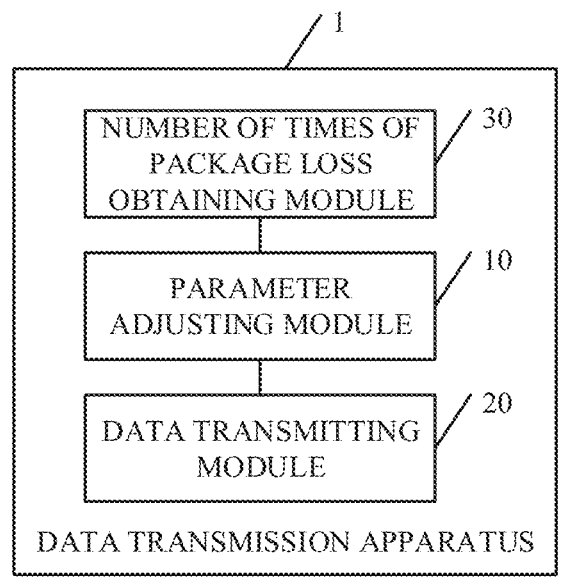
FIG. 12 is a schematic structural diagram of a data transmission apparatus provided in other implementations of the present disclosure.

In some implementations, as illustrated in FIG. 12, the apparatus further includes a number of times of package loss obtaining module 30 which is configured to obtain a number of times of package loss of data transmission from the terminal device to the target Bluetooth device via Bluetooth. The parameter adjusting module 10 is specifically configured to determine that the number of times of package loss of data transmission from the terminal device to the target Bluetooth device via Bluetooth is greater than a preset value, the preset value being an integer greater than or equal to 1.

It should be noted that, when the data transmission apparatus provided in the above implementations executes the data transmission method, the division of the above functional modules is only for illustrative purpose, and the above functions can be allocated to different functional modules to be completed as needed in practice. In other words, an internal structure of the apparatus is divided into different functional modules to complete all or part of the functions described above. In addition, the data transmission apparatus provided in the above implementations and the data transmission method implementations belong to the same concept, and reference of the implementation of the data transmission apparatus can be made to method implementations, which will not be repeated here.

The above-mentioned serial numbers of the implementations of the present disclosure are only for description, and do not represent priorities of implementations.

In implementations of the present disclosure, when the preset condition is determined to be met, the scan parameter of the Bluetooth scan or/and a data packet of data transmission is adjusted, and data is transmitted to the target Bluetooth device via Bluetooth according to the adjusted scan parameter or/and the adjusted data packet. In one aspect, by adjusting the scan parameter of the Bluetooth scan, the scan-window duration is shortened and/or scan windows are not partially overlapped, a transmission interval between two adjacent data packages is shorter, which can improve stability of data transmission. In another aspect, by adjusting the data packet of data transmission, a transmission code rate is lower, the transmission time interval between two adjacent data packages is shorter, and a packet transmission frequency is higher. Stability of data transmission can be optimized from multiple angles, and the delay of a whole path can be optimized. Different requirements of a user for connection speed and transmission stability in different usage scenarios can be met by adjusting the scan parameter of the Bluetooth scan and the like. In addition, the solution is simple to be realized and has good universality. Retransmitted data can also be read by the target Bluetooth device more quickly to avoid lag.

A computer storage medium is further provided in implementations of the present disclosure. The computer storage medium can store multiple instructions which are configured to be loaded by a processor to execute steps in implementations as illustrated in FIG. 1 to FIG. 10. Reference of a specific execution process can be made to specific description of the implementations as illustrated in FIG. 1 to FIG. 10, which will not be repeated here.

Figure 13:
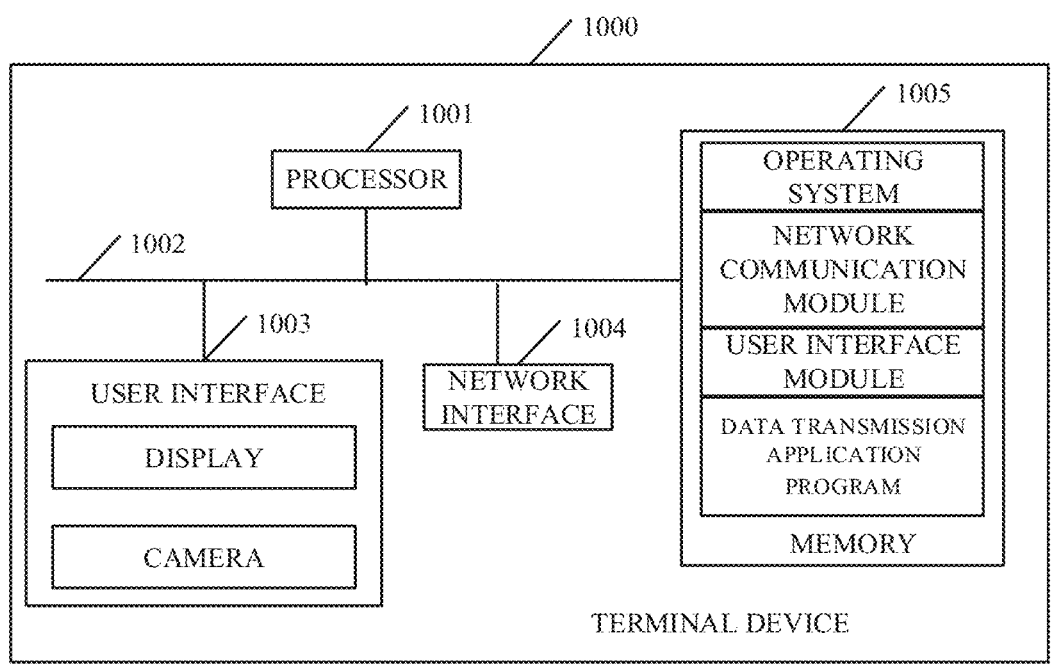
FIG. 13 is a schematic structural diagram of a terminal device provided in implementations of the present disclosure.

Reference is made to FIG. 13, which is a schematic structural diagram of a terminal device provided in implementations of the present disclosure. As illustrated in FIG. 13, the terminal device may include at least one processor 1001, at least one network interface 1004, a user interface 1003, a memory 1005, and at least one communication bus 1002.

The communication bus 1002 is configured to realize connection and communication among these components.

The user interface 1003 may include a display and a camera, and in some implementations, the user interface 1003 may further include a standard wired interface and a wireless interface.

The network interface 1004 may include a standard wired interface and a wireless interface (e.g., a WI-FI interface) in some implementations.

The processor 1001 may include one or more processing cores. The processor 1001 uses various interfaces and lines to connect various parts of the entire terminal device 1000, and executes various functions of the terminal device 1000 and processes data by running or executing instructions, programs, code sets, or instruction sets stored in the memory 1005, and calling data stored in the memory 1005. In some implementations, the processor 1001 may be implemented by adopting at least one of following hardware forms: digital signal processing (DSP), field-programmable gate array (FPGA), or programmable logic array (PLA). The processor 1001 may integrate one or a combination of a central processing unit (CPU), a graphics processing unit (GPU), a modem, and the like. The CPU mainly deals with an operating system, a user interface, and application programs; the GPU is configured for rendering and drawing of content that needs to be displayed on the display; the modem is configured to deal with wireless communication. It can be understood that, the modem may not be integrated into the processor 1001, but is implemented by a single chip.

The memory 1005 may include a random access memory (RAM), or a read-only memory (ROM). In some implementations, the memory 1005 includes a non-transitory computer-readable storage medium. The memory 1005 can be configured to store instructions, programs, codes, code sets, or instruction sets. The memory 1005 may include a program storing area and a data storing area, where the program storing area may store instructions for implementing the operating system, instructions for at least one function (such as a touch function, a sound playback function, an image display function, etc.), instructions used to implement the above method implementations, and the like. The data storing area may store data involved in the above method implementations and the like. In some implementations, the memory 1005 may also be at least one storage device located away from the processor 1001. As illustrated in FIG. 13, the memory 1005 as a computer storage medium may include an operating system, a network communication module, a user interface module, and a data transmission application program.

In the terminal device 1000 as illustrated in FIG. 13, the user interface 1003 is mainly used to provide an input interface for a user and obtain data input by the user, and the terminal device 1000 can be configured to execute the following specifically.

A scan parameter of a Bluetooth scan or/and a data packet of data transmission is adjusted, upon determining that a preset condition is met. Data is transmitted to a target Bluetooth device via Bluetooth according to an adjusted scan parameter or/and an adjusted data packet.

In an implementation, in terms of adjusting the scan parameter of the Bluetooth scan, the terminal device 1000 is configured to execute the following specifically.

A scan-window duration of the Bluetooth scan is adjusted, and/or start time of a first scan-window and start time of a second scan-window of the Bluetooth scan are adjusted.

When adjusting the scan-window duration of the Bluetooth scan, the terminal device 1000 is configured to execute adjusting a scan type of the Bluetooth scan from an interlaced scan to a standard scan. When adjusting the start time of the first scan-window and the start time of the second scan-window corresponding to the Bluetooth, the terminal device 1000 is configured to execute setting start time of the first scan-window corresponding to an inquiry scan and start time of the second scan-window corresponding to a page scan to be the same or differ by a first preset time threshold.

In an implementation, when adjusting the scan type of the Bluetooth scan from the interlaced scan to the standard scan, the terminal device 1000 is configured to execute the following specifically: adjusting a scan type of the inquiry scan from the interlaced scan to the standard scan when the Bluetooth scan includes the inquiry scan; adjusting a scan type of the page scan from the interlaced scan to the standard scan when the Bluetooth scan includes the page scan; or adjusting a scan type of the inquiry scan from the interlaced scan to the standard scan and adjusting a scan type of the page scan from the interlaced scan to the standard scan, when the Bluetooth scan includes the inquiry scan and the page scan.

In an implementation, the data packet includes a payload and/or a data code rate, and when adjusting the data packet of the data transmission, the terminal device 1000 is configured to execute the following specifically: adjusting the data packet of the data transmission from a first data packet to a second data packet, where a first payload corresponding to the first data packet is larger than a second payload corresponding to the second data packet, and/or a first data code rate corresponding to the first data packet is greater than a second data code rate corresponding to the second data packet.

In an implementation, in terms of transmitting the data to the target Bluetooth device via Bluetooth according to the adjusted scan parameter or/and the adjusted data packet, the terminal device 1000 is configured to execute the following specifically: scanning for a Bluetooth device by using the standard scan and transmitting the data by using the first data packet to the target Bluetooth device via Bluetooth; scanning for a Bluetooth device by using the interlaced scan and transmitting the data by using the second data packet to the target Bluetooth device via Bluetooth; or scanning for a Bluetooth device by using the standard scan and transmitting the data by using the second data packet to the target Bluetooth device via Bluetooth.

In an implementation, when determining that the preset condition is met, the terminal device 1000 is configured to execute the following specifically: determining that an environmental interference value of data transmission from the terminal device to the target Bluetooth device via Bluetooth meets a threshold condition, or determining that the terminal device needs to transmit multimedia data to the target Bluetooth device via Bluetooth.

In an implementation, wherein before determining that the environmental interference value of data transmission from the terminal device to the target Bluetooth device via Bluetooth meets the threshold condition, the terminal device 1000 is further configured to execute the following: obtaining a number of times of package loss of data transmission from the terminal device to the target Bluetooth device via Bluetooth. When determining that the environmental interference value of data transmission from the terminal device to the target Bluetooth device via Bluetooth meets the threshold condition, the terminal device 1000 is configured to execute the following specifically: determining that the number of times of package loss of data transmission from the terminal device to the target Bluetooth device via Bluetooth is greater than a preset value, the preset value being an integer greater than or equal to 1.

In implementations of the present disclosure, when the preset condition is determined to be met, the scan parameter of the Bluetooth scan or/and the data packet of data transmission is adjusted, and the data is transmitted to the target Bluetooth device via Bluetooth according to the adjusted scan parameter or/and the adjusted data packet. In one aspect, by adjusting the scan parameter of the Bluetooth scan, the scan-window duration is shortened and/or scan windows are not partially overlapped, a transmission interval between two adjacent data packages is shorter, which can improve stability of data transmission. In another aspect, by adjusting the data packet of data transmission, a transmission code rate is lower, the transmission time interval between two adjacent data packages is shorter, and a packet transmission frequency is higher. Stability of data transmission can be optimized from multiple angles, and the delay of a whole path can be optimized. Different requirements of a user for connection speed and transmission stability in different usage scenarios can be met by adjust the scan parameter of the Bluetooth scan and the like. In addition, the solution is simple to be realized and has good universality. Retransmitted data can also be read by the target Bluetooth device more quickly to avoid lag.

Those of ordinary skill in the art can understand that all or a part of procedures in method implementations can be implemented by instructing relevant hardware through a computer program, and the computer program can be stored in a computer-readable storage medium. When the computer program is executed, procedures in the method implementations can be implemented. The storage medium can be a magnetic disk, an optical disk, a read-only storage memory, or a random storage memory, and the like.

The above disclosures are only preferred implementations of the present disclosure, and of course, the scope of rights of the present disclosure cannot be limited by this. Therefore, equivalent changes made according to claims of the present disclosure are still within the scope of the present disclosure.

What is claimed is:

1. A data transmission method, applicable to a terminal device and comprising:
   adjusting a scan parameter of a Bluetooth scan or/and adjusting a data packet of data transmission under a condition; and
   transmitting data to a target Bluetooth device via Bluetooth according to an adjusted scan parameter or/and an adjusted data packet;
   wherein during data transmission, a Bluetooth scan function is enabled;
   wherein transmitting data to the target Bluetooth device via Bluetooth according to the adjusted scan parameter comprises:
      performing the Bluetooth scan according the adjusted scan parameter; and
      transmitting the data to the target Bluetooth device via Bluetooth during rest time of scanning.

2. The method of claim 1, wherein adjusting the scan parameter of the Bluetooth scan comprises:
   adjusting a scan-window duration of the Bluetooth scan.

3. The method of claim 2, wherein adjusting the scan-window duration of the Bluetooth scan comprises:
   adjusting a scan type of the Bluetooth scan from an interlaced scan to a standard scan.

4. The method of claim 3, wherein adjusting the scan type of the Bluetooth scan from the interlaced scan to the standard scan comprises:
   adjusting a scan type of an inquiry scan from the interlaced scan to the standard scan when the Bluetooth scan comprises the inquiry scan;
   adjusting a scan type of a page scan from the interlaced scan to the standard scan when the Bluetooth scan comprises the page scan; or
   adjusting a scan type of an inquiry scan from the interlaced scan to the standard scan and adjusting a scan type of a page scan from the interlaced scan to the standard scan, when the Bluetooth scan comprises the inquiry scan and the page scan.

5. The method of claim 1, wherein adjusting the scan parameter of the Bluetooth scan comprises:
   setting a start time of a first scan-window and a start time of a second scan-window to be the same or differ by a first time threshold.

6. The method of claim 5, wherein setting the start time of the first scan-window and the start time of the second scan-window to be the same comprises:
   setting the start time of the first scan-window and the start time of the second scan-window to be the same, and setting a duration of the first scan-window and a duration of the second scan-window to be same.

7. The method of claim 5, wherein the first time threshold is set to make the start time of the second scan-window is later than an end of the first scan-window by a second time threshold, and the first time threshold is a sum of the second time threshold and a duration of the first scan-window; and
   the first time threshold is greater than or equal to time required for an audio end to pack and transmit an audio data package to a Bluetooth transceiver module for buffering; or the second time threshold is greater than or equal to time required for transmission of one data package.

8. The method of claim 1, wherein adjusting the scan parameter of the Bluetooth scan comprises:
   setting a first scan-window and a second scan-window of the Bluetooth scan to be completely overlapped or to be non-continuous.

9. The method of claim 1, wherein the Bluetooth scan comprises an inquiry scan and a page scan.

10. The method of claim 1, wherein the data packet comprises a payload and/or a data code rate, and adjusting the data packet of the data transmission comprises:
    adjusting the data packet of the data transmission from a first data packet to a second data packet, wherein a first payload corresponding to the first data packet is larger than a second payload corresponding to the second data packet, and/or a first data code rate corresponding to the first data packet is greater than a second data code rate corresponding to the second data packet.

11. The method of claim 10, wherein transmitting the data to the target Bluetooth device via Bluetooth according to the adjusted scan parameter and the adjusted data packet comprises:
    scanning for a Bluetooth device by using a standard scan and transmitting the data by using the first data packet to the target Bluetooth device via Bluetooth;
    scanning for a Bluetooth device by using an interlaced scan and transmitting the data by using the second data packet to the target Bluetooth device via Bluetooth; or
    scanning for a Bluetooth device by using a standard scan and transmitting the data by using the second data packet to the target Bluetooth device via Bluetooth.

12. The method of claim 10, wherein when the data packet comprises the payload, a payload value is set during at least one of: a scan window of an inquiry scan or a scan window of a page scan, wherein the payload value is configured for generation of a data package matching the payload value during a period without data transmission.

13. The method of claim 1, wherein the condition comprises at least one of:
    an environmental interference value of data transmission from the terminal device to the target Bluetooth device via Bluetooth meets a threshold condition;
    the terminal device needs to transmit multimedia data to the target Bluetooth device via Bluetooth;
    a triggering operation is received from a user; or
    the terminal device is in a target usage scenario, the target usage scenario at least comprises a game scenario.

14. The method of claim 13, wherein the environmental interference value of data transmission from the terminal device to the target Bluetooth device via Bluetooth is determined to meet a threshold condition by determining that a number of times of package loss of data transmission from the terminal device to the target Bluetooth device via Bluetooth is greater than a value, the value being an integer greater than or equal to 1.

15. The method of claim 1, further comprising:
disabling an inquiry scan and/or a page scan, in a case that the terminal device has been connected to the target Bluetooth device and is playing at least one of audio data or video data and the terminal device is not allowed to be discovered by or connected with other Bluetooth devices.

16. The method of claim 1, further comprising:
adjusting back to a default Bluetooth scan parameter after multimedia data transmission is completed.

17. The method of claim 1, wherein adjusting the data packet of the data transmission comprises comprising:
adjusting the data packet of the data transmission from 2-DH5 to 2-DH3.

18. The method of claim 1, wherein the terminal device has been connected with the target Bluetooth device before adjusting a scan parameter of a Bluetooth scan or/and adjusting a data packet of data transmission under a condition.

19. A non-transitory computer storage medium storing a plurality of instructions which are configured to be loaded by a terminal device to:
adjust a scan parameter of a Bluetooth scan or/and adjust a data packet of data transmission, upon determining that a condition is met; and
transmit data to a target Bluetooth device via Bluetooth according to an adjusted scan parameter or/and an adjusted data packet;
wherein during data transmission, a Bluetooth scan function is enabled;
wherein in terms of transmitting data to the target Bluetooth device via Bluetooth according to the adjusted scan parameter, the plurality of instructions are configured to be loaded by the terminal device to:
perform the Bluetooth scan according the adjusted scan parameter; and
transmit the data to the target Bluetooth device via Bluetooth during rest time of scanning.

20. A terminal device, comprising:
a processor, a memory, and a network interface; wherein the memory stores a computer program, and the terminal device is configured to:
adjust a scan parameter of a Bluetooth scan or/and adjust a data packet of data transmission, upon determining that a condition is met; and
transmit data to a target Bluetooth device via Bluetooth according to an adjusted scan parameter or/and an adjusted data packet;
wherein during data transmission, a Bluetooth scan function is enabled;
wherein in terms of transmitting data to the target Bluetooth device via Bluetooth according to the adjusted scan parameter, the terminal device is configured to:
perform the Bluetooth scan according the adjusted scan parameter; and
transmit the data to the target Bluetooth device via Bluetooth during rest time of scanning.

* * * * *